Sept. 24, 1957     F. W. SUHR     2,807,765
CAPACITOR START AND RUN INDUCTION TYPE MOTOR
Filed Oct. 18, 1956
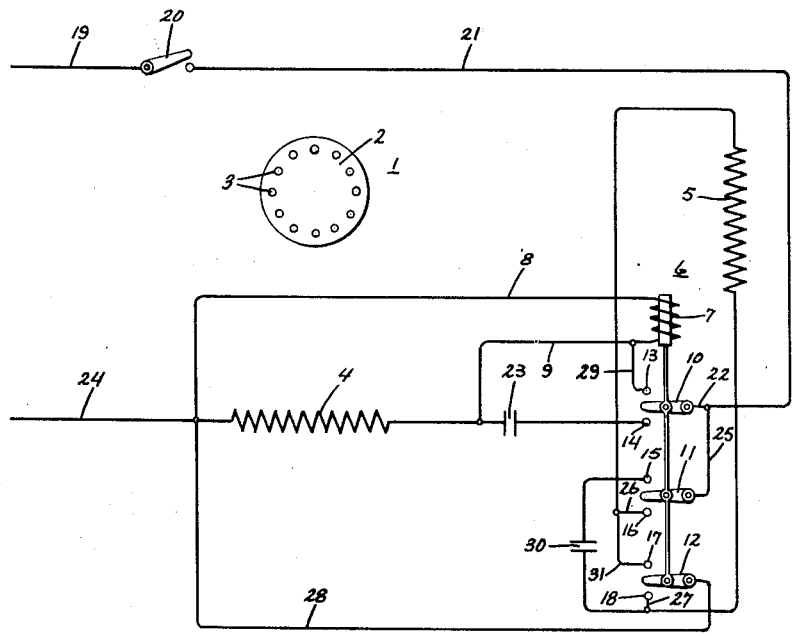
Inventor:
Fred W. Suhr,
by *Robert G. Iris*
His Attorney

2,807,765
CAPACITOR START AND RUN INDUCTION TYPE MOTOR

Fred W. Suhr, Fort Wayne, Ind., assignor to General Electric Company, a corporation of New York Application October 18, 1956, Serial No. 616,792

4 Claims. (Cl. 318—221)

This invention relates to dynamoelectric machines, and more particularly to an improved capacitor start and run single-phase induction-type electric motor.

In the field of single-phase induction-type electric motors, a common method of providing suitable starting torque is to provide a main winding and an auxiliary winding which are displaced both in time and in space from each other so as to set up a rotating field. While the phase displacement between the two windings may be obtained by any one of several phase displacement devices, an eminently satisfactory and widely used means of positively providing a large phase displacement between the two windings consists of providing a capacitance in series with one of the windings. Until recently, the capacitance has been placed in series with the auxiliary winding since the main winding has a relatively low resistance, and draws by far the greater amount of current, and since such current has a lagging power factor, the net effect of the motor on the single phase supply line has been that of a device with a lagging power factor. Such a type of device makes line voltage regulation considerably more difficult than is the case where it has the effect of a leading power factor on the line. For this reason, and because increased starting torque may thus be obtained for a given starting current, it has recently been proposed to place the starting capacitance in series with the main winding rather than the auxiliary winding.

The benefits of such a device, both from the leading power factor aspect and as to the improvement in the amount of starting torque obtained for a given current, have been discussed and analyzed in prior publications, such as, for instance, in an article entitled Design of single phase motors to minimize voltage dips by J. E. Williams which appeared at pages 484–487 of AIEE Transactions, Part III, 1953. However, previous disclosures of single-phase motors having the starting capacitor in series with the main winding have been restricted to the concept of an ordinary capacitor-start motor, that is, one where the motor starts on the main and auxiliary windings (with the capacitor connected as above provided); as the motor comes up to speed, the auxiliary winding and the starting capacitor are removed from the circuit so that the motor runs on the main winding alone.

The present invention contemplates the extension of the basic principle of placing the starting capacitance in series with the main winding to the type of circuit known as "capacitor start and run" wherein the motor starts with a predetermined capacitance and, after reaching a predetermined speed, runs on a different and generally smaller capacitance. While the starting capacitor is in the motor circuit for a relatively short period of time, and thus may have a construction which is quite inexpensive, a running capacitor for a motor requires a far more rugged and expensive construction in view of the fact that it must remain in the circuit as long as the motor operates. The greater the current through the capacitor, the greater the expense in building the capacitor to withstand and dissipate the heat generated. Since, as indicated above, the main winding of a motor is always constructed so as to have a relatively high current compared to the auxiliary winding, the main winding current would make the expense of a running capacitor in series therewith prohibitive. In addition, running capacitors are generally of low capacitance and, therefore, inherently have a high impedance which would substantially decrease the current in the main winding if it were in series therewith, thus markedly affecting the motor performance. It will thus be seen that despite the advantages known to be obtainable from placing the starting capacitor in the main winding circuit, the expense inherent in a high current running capacitor, and the harmful effect of a low capacitance in series with the main winding during operation, has precluded the use of this improved starting arrangement in capacitor start and run motors to date.

It is, therefore, an object of this invention to provide an improved capacitor start and run single-phase motor which will incorporate the desirable starting features discussed above without requiring the prohibitively expensive running capacitor that has in the past appeared to be necessary if such a starting arrangement were provided.

In one aspect thereof, the invention provides a single-phase induction-type electric motor which includes a main winding and a parallel auxiliary winding in electrically spaced relation thereto. A starting capacitor is arranged in series with the main winding during starting of the motor, and a running capacitor is arranged in series with the auxiliary winding during running of the motor. Speed responsive means are arranged to open the connection to the starting capacitor at a predetermined speed without disconnecting the main winding. Because of the fact that the starting capacitor has its effect on the main winding during starting and the running capacitor is in series with the auxiliary winding after operation of the relay, there is a tendency on the part of the motor to reverse its direction of rotation upon operation of the relay. However, the present invention provides that the speed responsive means will reverse the polarity of one winding relative to the other at the same time that the connection to the starting capacitor is opened so that the motor will continue to come up to speed and will run as a capacitor-run motor. With this arrangement, a relatively small current passes through the running capacitor and consequently a relatively inexpensive construction may be used. This is effected while retaining the advantageous starting conditions which are achieved by the provision of the starting capacitor in series with the main winding.

The features of the invention which are believed to be novel are set forth with particularity in the appended claims. The invention itself, however, both as to its organization and method of operation, together with further objects and advantages thereof, may best be understood by reference to the following description taken in connection with the accompanying drawing.

In the drawing, the single figure is a schematic diagram of the circuit of the improved capacitor start and run motor of this invention.

Referring now to the figure of the drawing, there is shown a single-phase induction-type electric motor, generally indicated at 1, having a rotatable member 2 provided in the usual manner with a plurality of conductors 3 extending therethrough and arranged to be joined at their ends by short circuiting rings (not shown) so as to form a winding. Motor 1 has a main field winding 4 and an auxiliary field winding 5. A device responsive to the speed of rotor 2, such as relay 6 having coil 7 connected across main winding 4, is arranged to control three contact arms 10, 11, and 12 respectively engageable with contacts 13 and 14, 15, and 16, and 17 and 18. In their normal positions, contact arms 10, 11 and 12 are in engagement with contacts 14, 16 and 18 respectively. When the contact arms are so arranged, main winding 4 is adapted to be connected across a source of alternating current single phase power (not shown) through line 19, switch 20, line 21, line 22, contact arm 10, contact 14, starting capacitor 23, main winding 4, and line 24. At the same time that the main winding circuit is completed, a circuit through auxiliary winding 5 is completed through line 21, line 25, contact arm 11, contact 16, line 26, the auxiliary winding 5, line 27, contact arm 12, line 28, and line 24. It will be observed that with the arrangement just described, both the main winding 4 and auxiliary winding 5 are energized, with the starting capacitor being in series with the main winding and providing the advantageous results described in the previously cited publication.

It will also be observed that with the above circuit, relay coil 7 is energized. At a predetermined speed of rotation of rotor 2, the potential across coil 7 becomes high enough to actuate the relay and move contact arms 10, 11 and 12 into engagement with contacts 13, 15 and 17 respectively. With this arrangement, the main winding circuit is completed in substantially the same manner as before with the single exception that the starting capacitor 23 is bypassed with the circuit passing instead through contact 13, line 29 and line 9. The relay remains in the circuit to hold the contact arms in their new operative position. The circuit through the auxiliary winding 5 is completed, starting at contact arm 11, through contact 15, running capacitor 30, auxiliary winding 5, line 31, contact 17, contact arm 12, line 28, and line 24.

This connection has a dual effect: it includes the running capacitor 30 in the circuit at the same time that the starting capacitor 23 is removed therefrom, and it reverses the connections of winding 5 relative to winding 4. When the running capacitor is connected in series with the auxiliary winding 5, the current therein tends to lead the current in main winding 4 whereas previously the opposite was true. This is an inherent result of providing in series with a winding a device such as a capacitor which has the effect of providing a leading power factor. When the relationship of the two windings is thus reversed, motor 1 tends to have its rotor 2 reverse its direction of rotation which, of course, is fatal to the proper operation of the motor. For this reason, reversal of auxiliary winding 5 relative to winding 4 at the same time that the power factor relationship between them is reversed maintains the relationship the same and the motor will run properly as a capacitor-run motor with the advantages inherent in such a type of construction.

It will be observed from the foregoing that the invention provides a capacitor start and run single-phase induction-type motor where the advantages of the starting capacitor in series with the main winding and the auxiliary winding in parallel with the main winding during running are both realized. In addition, the starting capacitor is provided in the main winding line while the running capacitor is provided in the auxiliary winding line, thus providing the improved line regulation and starting torque features while retaining the economical construction of the running capacitor and the desired motor operating characteristics.

While this invention has been explained by describing a particular embodiment thereof, it will be apparent that improvements and modifications may be made without departing from the scope of the invention as defined in the appended claims.

What I claim as new and desire to secure by Letters Patent of the United States is:

1. A single-phase induction-type electric motor comprising a main winding, an auxiliary winding arranged in electrically spaced relation to said main winding, a starting capacitor connected in series with said main winding during starting of said motor, a running capacitor of low capacitance relative to said starting capacitor connected in series with said auxiliary winding during running of said motor, said main winding and said auxiliary winding being connected in parallel during both starting and running of said motor, and speed responsive switching means for reversing the polarity of said auxiliary winding relative to said main winding and for opening the connection to said starting capacitor at a predetermined speed.

2. A single-phase induction-type electric motor comprising an auxiliary winding, a main winding having a low resistance relative to said auxiliary winding arranged in electrically spaced relation thereto, a starting capacitor, a running capacitor of low capacitance relative to said starting capacitor, a relay coil connected across said main winding, and three contact arms controlled by said relay coil and movable from a first position to a second position in response to a predetermined potential across said coil as said motor comes up to speed, one of said contact arms completing a series circuit through said main winding and said starting capacitor in its first operative position and completing a circuit through said main winding without said starting capacitor in its second operative position, said second and third contact arms connecting said auxiliary winding alone in parallel with said main winding in their first operative positions, and connecting said auxiliary winding with its polarity reversed relative to said main winding and placing said running capacitor in series with said auxiliary winding in their second operative positions.

3. A single-phase induction-type electric motor comprising a main winding, an auxiliary winding arranged in electrically spaced relation to said main winding, a starting capacitor, a running capacitor of low capacitance relative to said starting capacitor, and speed responsive switching means movable from a first operative position to a second operative position at a predetermined speed, said switching means connecting said windings in parallel in both of said operative positions, said switching means when in said first operative position connecting said starting capacitor in seires with said main winding, said switching means when in said second operative position reversing the polarity of said auxiliary winding relative to said main winding, including said running capacitor in series with said auxiliary winding, and opening the connection to said starting capacitor.

4. A single-phase induction-type electric motor comprising an auxiliary winding, a main winding having a low resistance relative to said auxiliary winding arranged in electrically spaced relation thereto, a starting capacitor, a running capacitor of low capacitance relative to said starting capacitor, speed responsive means, and switch means controlled by said speed responsive means, and movable at a predetermined speed from a first operative position to a second operative position, said switch means connecting said windings in parallel in both of said operative positions, said switch means when in said first operative position connecting said starting capacitor in series with said main winding, said switch means when in said second operative position reversing the polarity of one of said windings relative to the other, opening the connection to said starting capacitor, and connecting said running capacitor in series with said auxiliary winding.

No references cited.